United States Patent [19]

Pratolongo

[11] Patent Number: 5,397,283
[45] Date of Patent: Mar. 14, 1995

[54] AUTOMATICALLY CONTROLLED CONTINUOUSLY VARIABLE TRANSMISSION

[75] Inventor: Modesto Pratolongo, Milan, Italy

[73] Assignee: Mercantile Lombard Company Ltd., London, England

[21] Appl. No.: 98,367

[22] PCT Filed: Mar. 6, 1992

[86] PCT No.: PCT/GB92/00404
  § 371 Date: Aug. 3, 1993
  § 102(e) Date: Aug. 3, 1993

[87] PCT Pub. No.: WO92/15804
  PCT Pub. Date: Sep. 17, 1992

[30] Foreign Application Priority Data
  Mar. 7, 1991 [GB] United Kingdom ............ 9104864

[51] Int. Cl.⁶ .................... F16H 3/74; F16H 13/08
[52] U.S. Cl. ............................. 475/254; 475/255
[58] Field of Search ........... 475/254, 255, 257, 258, 475/331, 206

[56] References Cited
U.S. PATENT DOCUMENTS
1,883,355 10/1932 Edberg .................... 475/255
2,654,269 10/1953 Wilson .................... 475/266 X FOREIGN PATENT DOCUMENTS
3911865 12/1989 Germany ............ F16H 3/74
59-69556 4/1984 Japan .................. F16H 3/44
2097875 11/1982 United Kingdom ..... F16H 3/74

Primary Examiner—Charles A. Marmor
Assistant Examiner—Nathan O. Jensen
Attorney, Agent, or Firm—Darby & Darby

[57] ABSTRACT

A driving hub (6) connected to a first shaft (3) rotatably carries primary planet wheels (10) meshing with first (11) and second (12) sun wheels in coaxial relation. The first sun wheel (11) is fastened to a helical crown gear (16) meshing with auxiliary planet wheels (18) rotatably linked to the second sun wheel (12). Eccentrically projecting from the auxiliary planet wheels are respective interconnecting elements (22) guided in a trochoidal rolling track (23) formed in a guide member (24) fastened to a second shaft (5). Each auxiliary planet wheel (18) is driven by a piston (28) engaged in a pressurization chamber (29) formed in the second sun wheel (12). A fluid supplying circuit (30–35) sends oil under pressure into the pressurization chambers (29) in order to transmit axial thrusts to the auxiliary planet wheels (18), which thrusts, by effect of the helical toothings, produce balanced forces interacting with a motive power so as to transmit motion from the first (3) to the second (5) shaft.

13 Claims, 5 Drawing Sheets

| VM | VU | VK | VS | Cus | Cud | Mt" |
|---|---|---|---|---|---|---|
| 600 | 100 | 933,3 | 2600 | 0,4 | 5,6 | 6 |
| " | 200 | 866,6 | 2200 | " | 2,6 | 3 |
| " | 300 | 800,0 | 1800 | " | 1,6 | 2 |
| " | 400 | 733,3 | 1400 | " | 1,1 | 1,5 |
| " | 500 | 666,6 | 1000 | " | 0,8 | 1,2 |
| " | 600 | 600,0 | 600 | " | 0,6 | 1 |
| " | 800 | 466,6 | −200 | " | 0,35 | 0,75 |
| " | 1200 | 200,0 | −1800 | " | 0,1 | 0,5 |

AUTOMATICALLY CONTROLLED CONTINUOUSLY VARIABLE TRANSMISSION

DESCRIPTION

The present invention relates to a device for the dynamic coupling between two propeller shafts, with possibility of variation in the transmitted torque and speed values.

Such a device can find a great number of applications in the mechanics field. In the embodiment hereinafter described by way of example only, the device is used in the motor car field, in place of the traditional friction clutches or stepless speed change gears.

However, the apparatus of the invention lends itself to be advantageously used in any situation in which it is necessary to interconnect two propeller shafts while keeping the possibility of disconnecting and restoring the dynamic connection between said shafts at any moment, as well as suitably varying the torque and speed values according to which the physical transmission of motion takes place.

It is known that in many mechanical applications stepless speed change gears are used. In particular, in the motor car field said stepless speed change gears are used to interconnect the drive shaft and the propeller shaft, the latter being in turn connected to the wheels.

The use of these stepless speed change gears offers the possibility of suitably altering the torque and speed values according to which power is transmitted to the driven shaft. In other words, the parameters according to which the transmission of motion occurs can be instantaneously altered depending upon requirements.

The stepless speed change gears can be substantially classified according to their fundamental features in three different types:
the mechanical type,
the electrical type,
the hydraulic type.

The mechanical speed change gears are presently made according to different solutions all of them exploiting, for the operation of the same, the adhesion between suitable active surfaces pressed against each other.

For example in one type of mechanical speed change gear commonly used the transmission of motion between the drive shaft and driven shaft takes place through a belt or another type of flexible element of trapezoidal section, operatively engaged between two pulleys each of them being mounted on one of said shafts and consisting of two conical elements the axial distance of which can be modified. In particular, when the disc-shaped elements of one of the pulleys move close to each other the disc-shaped elements belonging to the other pulley correspondingly move apart from each other. In this manner the winding radii of the flexible element on each individual pulley vary and thus there is a variation in the gear ratio.

However, due to the intrinsic nature of known mechanical speed change gears they always involve some sliding between the parts through which the transmission of motion occurs, which results in a reduction of efficiency by effect of friction energy losses. In addition, it is difficult to accomplish mechanical speed change gears capable of transmitting very high torques and powers.

It is also noted that for achieving the correct operation of mechanical speed change gears suitable adjusting devices must be combined therewith, adapted to control the gear ratio variation based on given parameters.

Referring to electric speed change gears, it is noted that the operation of the same substantially involves the use of an electric generator converting the mechanical energy issuing from the drive shaft to electric energy. The electric energy is converted again to mechanical energy by an electric motor associated with the driven shaft. By adjusting the main electric quantities (current and voltage) in the motor and generator, the desired speed variation of the driven shaft relative to that of the drive shaft is achieved.

In this type of speed change gears the efficiency is greatly impaired due to energy losses occurring in converting the mechanical energy to electric energy and vice versa. In addition, in this case too the presence of adjusting devices is needed in order to control the torque and speed variations in the driven shaft.

In hydraulic speed change gears, also referred to as "torque converters", the transmission of motion and torque from the drive shaft to the driven shaft takes place through the forces exerted by a liquid on suitable bladings in respect of which the liquid carries out a relative movement. In greater detail, the torque converter is substantially comprised of three bladed elements all received in a single housing and between which the motion transmitting liquid circulates. These bladed elements respectively consist of a pump connected to the drive shaft, a turbine connected to the driven shaft and arranged to collect the energy imparted to the liquid upon the action of the pump, as well as a bladed statoric element connected to the fixed framework supporting the overall speed change gear. The statoric element collects the liquid issuing from one of the two other bladed elements and alters the direction and speed thereof so as to send it back to the other bladed element. The statoric element is therefore submitted to a torque reaction which is transmitted to the framework. The presence of this torque reaction enables a different torque to be obtained at the outlet shaft relative to the torque at the input of the speed change gear.

In the hydraulic speed change gears too the efficiency in the transmission of motion is greatly impaired due to the dissipation of energy in the form of heat as a result of pressure losses during the liquid displacements.

It appears from the foregoing that all known speed change gears involve great energy losses in the transmission of motion. In addition they must necessarily have a very complicated structure and be of great weight and bulkiness when they need to be arranged so as to transmit high powers and/or high torque values.

The main object of the present invention is substantially to eliminate the problems of the known art by providing a device adapted to transmit motion from a drive shaft to a driven shaft, offering the possibility of automatically setting up a relative rotation between said shafts when the resisting torque on the driven shaft is increasing, so as to increase the value of the transmitted torque.

An important operating feature that the device of the invention aims to reach is the substantial absence of energy loss in the form of heat in any operating condition.

The device in question must also be capable of transmitting powers and torques of high value while keeping a simple, compact and relatively light-in-weight structure.

In accordance with the invention, these objects are achieved by the operating coupling of a differential gear with a cycloidal gearing mating a trochidal kinematic mechanism.

In greater detail, the differential gear has primary planet wheels linked to a driving hub connected to the drive shaft, as well a first and a second sun wheel meshing with said primary planet wheels. The cycloidal gearing has a crown gear coaxially fastened to the first sun wheel of the differential and meshing with auxiliary planet wheels rotatably carried by the second sun wheel of the differential itself. The trochoidal kinematic mechanism is in turn comprised of a guide member provided with a trochoidal rolling track within which interconnecting elements are guided each of which is eccentrically carried by one of the auxiliary planet wheels. Actuator means applies resultant forces in opposition to each other to the planet wheels and crown gear, which forces interact with a motive power applied to the primary planet wheels to transmit motion to the guide member and crown gear.

The overall twisting moment transmitted to the guide member and therefore to a shaft integral therewith, corresponds to the value of the torque applied to the first sun wheel added with the product of the torque applied to the second sun wheel by the value of the ratio existing between the rotational speeds of the second and first sun wheels.

In accordance with the present invention, the transmission of motion practically takes place in the same manner as in electric motors where the rotating force field leads a rotor to movement, with the difference that in the device in question the rotating force field created by rotation of the primary planet wheels is transferred to the second shaft due to a phenomenon of mechanical induction.

Such a device has been found capable of varying the torque transmitted from the drive shaft to the driven shaft by directly reacting on the drive shaft itself, without requiring that the reaction on the torque increase be transmitted to the structure carrying the device, as currently happens in all known speed change and speed reducing gears.

Further features and advantages will become more apparent from the detailed description of a preferred embodiment of a device for the dynamic coupling between two propeller shafts with a possibility of variation in the transmitted torque and speed values in accordance with the present invention, given hereinafter by way of non-limiting example with reference to the accompanying drawings, in which.

Figure 1:
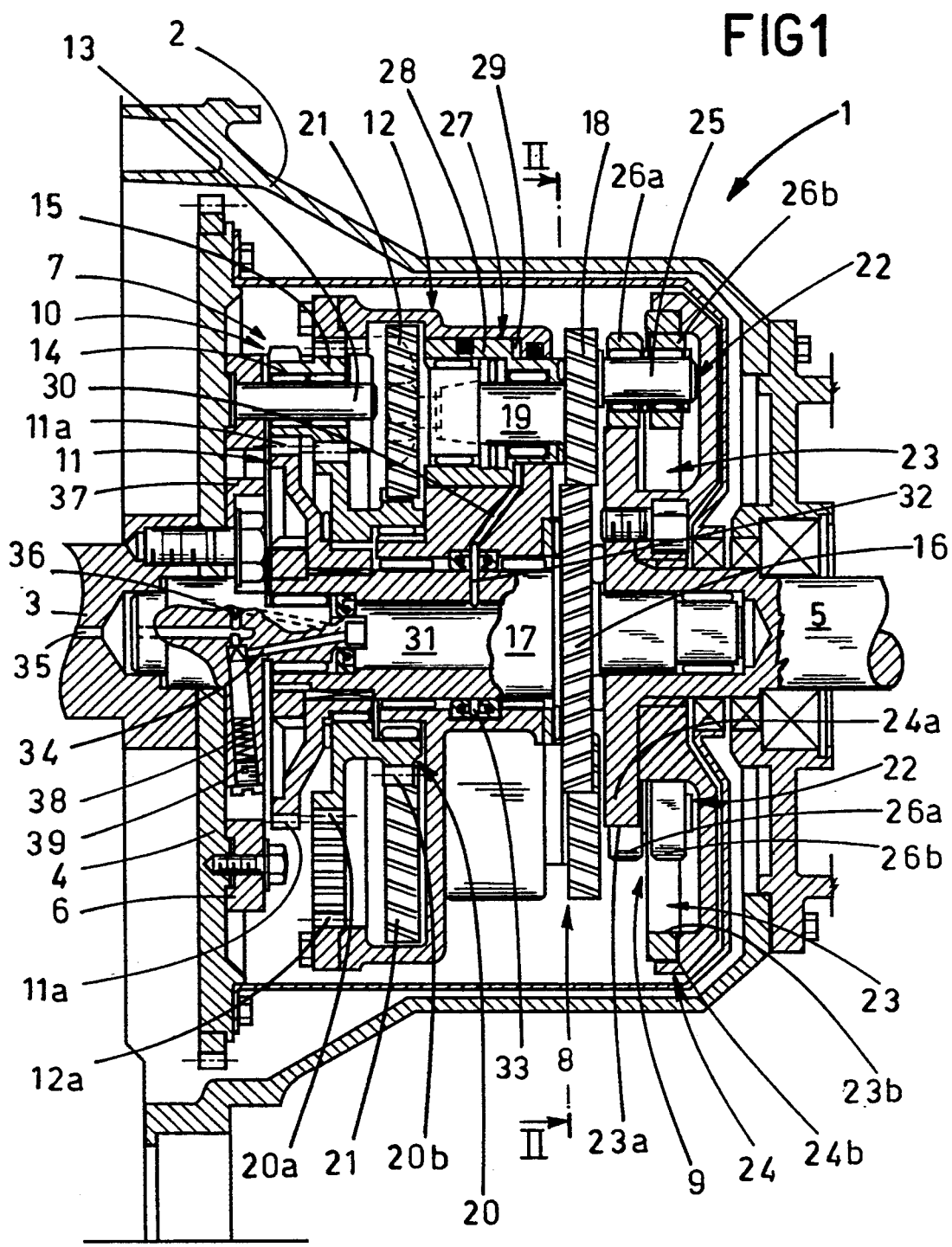
FIG. 1 shows the device seen in section according to a diametrical plan represented by line I—I in FIG. 2.
Figure 2:
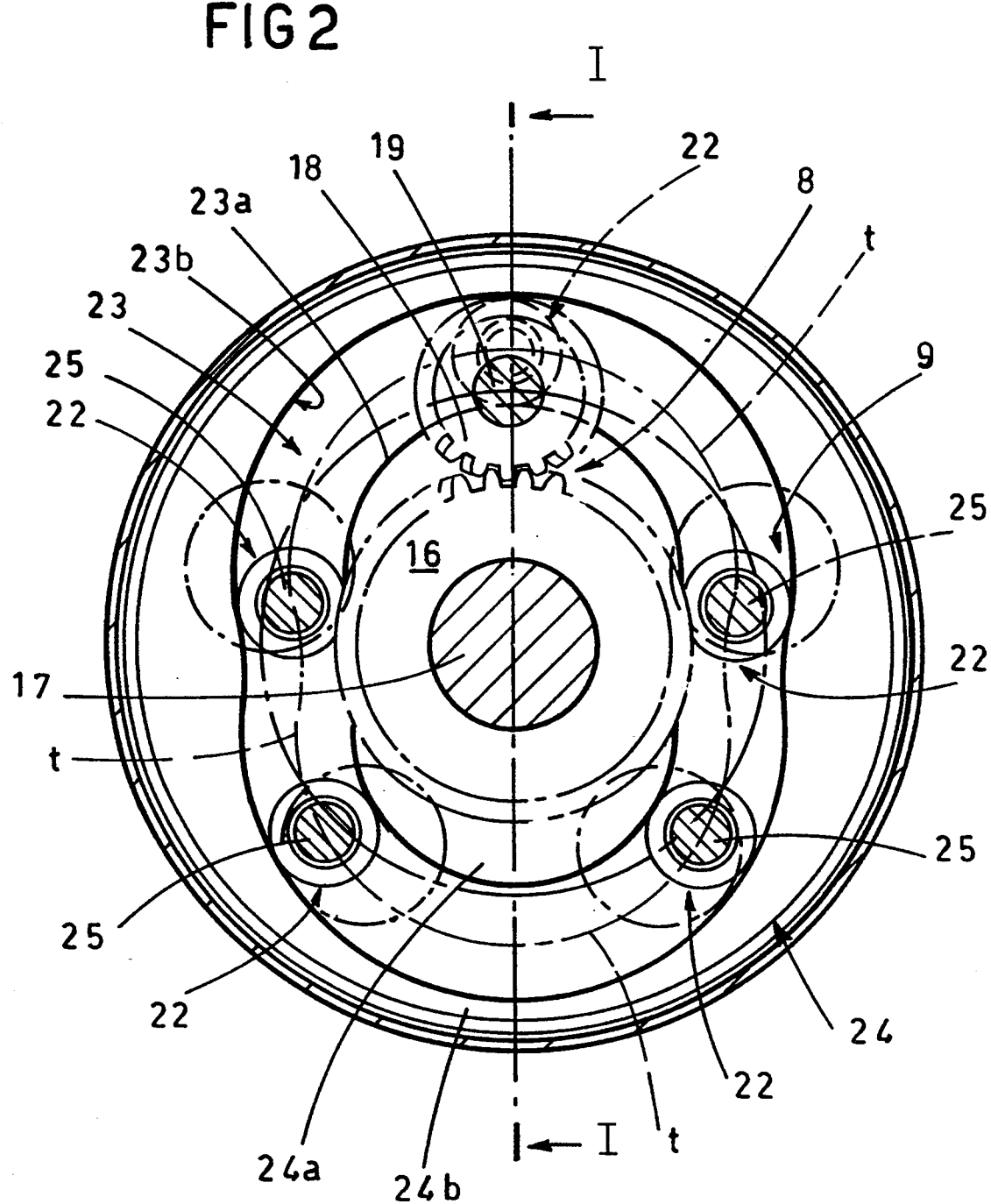
FIG. 2 is a sectional view of the device taken along line II—II in FIG. 1.

Referring to the drawings and in particular to FIGS. 1 and 2, a device for the dynamic coupling between two propeller shafts with possibility of variation in the transmitted torque and speed values in accordance with the present invention has been generally identified by reference numeral 1.

In the embodiment shown the device, enclosed in a protection bell 2, is operatively interposed between the engine and the gearing system of a motor-vehicle. Therefore the device 2 operates between one shaft 3 consisting of the crankshaft of said engine and conventionally carrying a flywheel 4, and a second shaft 5 disposed in coaxial relation to the first shaft 3.

The device 1 comprises a driving hub 6, of annular configuration, fastened to the flywheel 4 so as to be coaxially secured to the first shaft 3 and operable in rotation upon command of the first shaft.

In order to transmit the rotatory motion from the driving hub 6 to the second shaft 5, the device 1 uses a differential gear 7 operatively interconnected with a cycloidal gearing 8 mating a trochoidal kinematic mechanism 9.

The differential 7 comprises primary planet wheels 10 rotatably interconnected with the driving hub 6 and operatively engaged between a first and a second sun wheel 11 and 12 respectively, to distribute a twisting moment transmitted by the driving hub 6 to said sun wheels. In particular the primary planet wheels 10 are intended to divide the twisting moment coming from the hub 6 into substantially equal parts to be transmitted to the first and second sun wheels 11, 12 so that the torque consequently transmitted to the first sun wheel be slightly lower than that transmitted to the second sun wheel 12.

Each primary planet wheel 10 comprises a supporting pin 13 extending from the driving hub 6 parallely to the axis thereof and rotatably carrying a first pinion 14 meshing with an outer toothing 11a exhibited by the first sun wheel 11, as well as a second pinion 15 integral with the first pinion 14 and meshing with an inner toothing 12a offered by the second sun wheel 12. In the embodiment described, the first pinion 14 is of smaller diameter than the second pinion, so as to balance torques on the sun wheels 11, 12 as previously described.

In the example shown, the presence of three primary planet wheels 10 is provided, only one of which can be seen in FIG. 1, circumferentially distributed according to angles of 120°.

In the cycloidal gearing 8 there is the presence of a crown gear 16 coaxially and rigidly interconnected with the first sun wheel 11 through a interconnecting shank 17 rigidly engaged to the first sun wheel and rotatably carrying the second sun wheel 12.

The crown gear 16 operatively meshes with a plurality of auxiliary planet wheels 18, in the number of five in the example shown, circumferentially distributed about the crown gear and rotatably linked to the second sun wheel 12 by respective supporting stems 19 projecting in coaxial relation from each of the auxiliary planet wheels.

As can be easily viewed from the accompanying drawings, the toothings of the auxiliary planet wheels and crown gear 16 are provided to be of the helical type, to the ends to be better clarified in the following.

The auxiliary planet wheels 18 and primary planet wheels 10 should also be mutually linked as regards the respective rotations about their own geometrical axes. To this end, coaxially associated with the differential 7 and freely rotating relative thereto is an interconnecting sun wheel 20 operatively meshing, through respective toothings 20a, 20b, with the second pinion 15 of each primary planet wheel and with connecting pinions 21 each fitted on the supporting stem 19 of one of the auxiliary planet wheels 18. The toothings of the connecting pinions 21 and the corresponding toothing 20b of the interconnecting sun wheel 20 are of the helical type, like the toothings of the auxiliary plane wheels 18 and crown gear 16.

The trochoidal kinematic mechanism 9, in turn, substantially comprises a plurality of interconnecting elements 22 each of which is eccentrically secured to one of the auxiliary planet wheels 18 and is slidably guided in a rolling track 23 (FIG. 2) defined in a guide member 24 rigidly carrying the second shaft 5 and coaxially linked to the crown gear 16, with possibility of oscillation relative to the same.

Referring particularly to FIG. 2 where only one of the auxiliary planet wheels 18 has been shown for the sake of clarity, the rolling track 23 has a trochoidal extension substantially defined by the path described by the single interconnecting elements 22 when, in the presence of a relative rotation between the second sun wheel 12 and crown gear 16, the individual auxiliary planet wheels 18 are operated so as to carry out a revolution relative to the axis of the crown gear and a rotation about the respective axes.

The construction of the trochoidal rolling track 23 is such that the guide member 24, while being oscillatably linked to the crown gear 16, will be able to rotate relative to the latter but in the presence of a relative rotational sliding between the auxiliary planet wheels 18 and crown gear 16.

The configuration of the rolling track 23 is closely connected with the mutual arrangement and size ratio between the crown gear 16 and the individual auxiliary planet wheels 18, as well as with the eccentricity "e" (FIGS. 3 and 4) exhibited by the interconnecting elements 22 relative to the auxiliary planet wheels 18. More particularly, the path of the interconnecting elements 22 will be shaped according to a plurality of portions of epicycloid or normal, shortened or lengthened, hypocycloid the number of which is equal to the ratio between the radaii of the crown gear 16 and the planet wheels 18. In this connection it is important that the radius value of the crown gear 16 should be an integral multiple of the radius value of the individual auxiliary planet wheels 18.

In the embodiment described the auxiliary planet wheels 18 roll externally to the crown gear 16 and the ratio between the radius of the pitch line R of the crown gear 16 and the radius of the pitch line r' of each auxiliary planet wheel 18 is 2:1. As a result, the conformation of the rolling track 23 substantially corresponds to a double epicycloid disposed symmetrically relative to the crown gear.

This track at all events will take an extension greatly different from the one shown if different size ratios are adopted between the crown gear 16 and the auxiliary planet wheels 18 and/or if the planet wheels are coupled to a crown gear having inner teeth.

In order to eliminate sliding frictions between the interconnecting elements 22, the guide member 24 is provided to be comprised of one shaped plate 24a integral with the second shaft 5 and defining the inner edge 23a of the rolling track 23 and a second shaped plate 24b, fastened to the first plate 24a at an axially offset position relative to the same and defining the outer edge 23b of the rolling track.

Each interconnecting element 22 comprises a pin 25 projecting from the corresponding auxiliary planet wheel 18 parallel to the axis thereof and rotatably carrying at least a first and a second roller 26a, 26b acting in contact relation against the inner edge 23a and the outer edge 23b respectively of the rolling track 23. In this manner, during the movement of the respective interconnecting element 22 along the rolling track 23, the first and second rollers 26a, 26b will roll in the two opposite ways about the axis of the supporting pin 25, so that the movement of the interconnecting element takes place substantially in the absence of sliding frictions.

The device in accordance with the invention also comprises actuator means 27 adapted to generate opposed tangential forces on the auxiliary planet wheels 18 and crown gear 16, which forces, as explained in more detail in the following, interact with a motive power applied by the hub 6 to the centre of the primary planet wheels 10 so as to transmit a twisting moment to the second shaft 5.

Said actuator means, acting between the second sun wheel 12 and the individual auxiliary planet wheels 18, produces an axial thrust action on the auxiliary planet wheels which will be converted into said opposed tangential forces by virtue of the interference between the helical toothings belonging to the planet wheels and crown gear respectively.

In greater detail, the actuator means 27 is essentially comprised of a number of pistons 28 within each of which the stem 19 of one of the auxiliary planet wheels 18 is rotatably engaged and held against axial movements. Each piston 28 is slidably and sealingly inserted in a pressurization chamber 29 defined within a tubular expansion offered by the second sun wheel 12.

In addition, in the actuator means 27 there is the presence of a fluid supplying circuit communicating with each of the pressurization chambers 29 to simultaneously send a working fluid under hydrostatic pressure thereto, giving rise, as a result, to the axial thrust action on the individual auxiliary planet wheels 18 through the corresponding pistons 28.

In the embodiment shown by way of example, in said fluid supplying circuit provision is made for one supply duct 30 opening into each pressurization chamber, said supply duct being formed in the second sun wheel 12 and communicating with a distribution chamber 31 formed in the interconnecting shank 17 that opens into each pressurization chamber.

The connection between the single supply ducts 30 and the distribution chamber 31 is achieved by at least a through hole 32 radially formed in the interconnecting shank 17 and opening into a circumferential groove 33 exhibited internally of the second sun wheel 12.

Opening into the distribution chamber 30 through one or more connecting ducts 34 is a feeding duct 35 coaxially formed in the first shaft 3 and constantly fed with oil under pressure from the engine oil system. The entry of oil into the distribution chamber 30 is shutoff by one or more cut off elements 36 each acting on one of the connecting ducts 34.

In greater detail, the cut off elements 36 are slidably engaged into a flanged element 37 coaxially fastened to the driving hub 6 and are movable, each against the action of a preloading spring 38, in a direction substantially radial to the axis of the device 1 by effect of the centrifugal force. In this way, the passage of working fluid to the distribution chamber 31 is caused only when the rotational speed of the driving hub 6 exceeds a predetermined value. This value can optionally be modified depending upon requirements, acting on threaded adjusting elements 39 operatively engaged in the flanged element 37 and acting on the respective preloading springs 38, on the opposite side from the cut off elements 36.

Operation of the device in accordance with the invention described above mainly as regards structure is as follows.

Supposing that a predetermined power is applied to the first shaft 3 and consequently to the driving hub 6, which power is expressed as the product of the rotational speed of the shaft by the applied twisting moment or torque, it appears that the transmission of power to the second shaft 5 depends on the state of activation or deactivation of the actuator means 27.

In greater detail, in the absence of pressure in the pressurization chambers 29, the auxiliary planet wheels 18 are carried by the second sun wheel 12 in a revolution movement about the axis of the crown gear 16, while simultaneously performing a rotation about the respective axes, in the same rotational way as the second sun wheel itself.

The rotational speed of the auxiliary planet wheels about their own geometrical axes, by effect of the presence of the interconnecting sun wheel 20, will be equal to that of the primary planet wheels 10. However the revolution speeds of the primary 10 and auxiliary 18 planet wheels about the main axis of the device 1 could also be greatly different.

The interconnecting elements 22 freely travel along the rolling track 23, being guided by the movement imparted to them through the corresponding auxiliary planet wheels 18.

Under this situation, since there is no rotation on the auxiliary planet wheels 18, it is impossible to apply any force to the guide member and consequently to the second sun wheel 12 and first sun wheel 11.

In other words, the first and second shafts 3, 5 are completely disengaged to the ends of the transmission of motion.

When on the contrary a hydrostatic pressure is set up in the pressurization chambers 29 (for example when the effects of the centrifugal forces cause the openings of the connecting ducts 34 by the cut off members 36), the tangential thrust forces produced on the auxiliary planet wheels 18 and the crown gear 16 due to the axial thrust applied to the planet wheels themselves interact with the motive power applied to the centre of the primary planet wheels 10 by effect of the driving action carried out by the hub 6, bringing about the transmission of motion and twisting moment to the second shaft 5.

In greater detail, according to the preceding description, the differential 7 divides the twisting moment from the first shaft 3 into torques that are substantially equal both on the first and second sun wheels 11, 12.

The torque consequently applied to the first sun wheel 11 is directly transmitted to the crown gear 16 integral with the first sun wheel itself. Since no possibility of relative rotational exists, for the above reasons, between the crown gear 16 and guide member 24, as a result the torque applied to the first sun wheel 11 integrally passes to the guide member and therefore to the second shaft 5 to which a resistance to rotation is supposed to be applied.

As regards the torque applied to the second sun wheel 12, it is noted instead that this torque is transmitted to the guide member according to a value proportional to the number of performed circuit travels per unit time by the interconnecting members 22 within the rolling track 23. This number of circuit travels is expressed by the ratio existing between the rotational speed of the second sun wheel 12 and the rotational speed of the first sun wheel 11, the latter being equal to the rotational speed of the guide member 24 and therefore of the second shaft 5.

The value of the overall twisting moment transmitted to the second shaft 5 corresponds to the sum of the torque transmitted to the guide member 24 by the first sun wheel 11 and the torque transmitted still to the guide member by the second sun wheel 12.

The product of the overall twisting moment transmitted to the second shaft 5 multiplied by the rotational speed of the shaft itself will always be such as to be equal to the power introduced into the first shaft 3, apart from slight friction losses.

Figure 3:
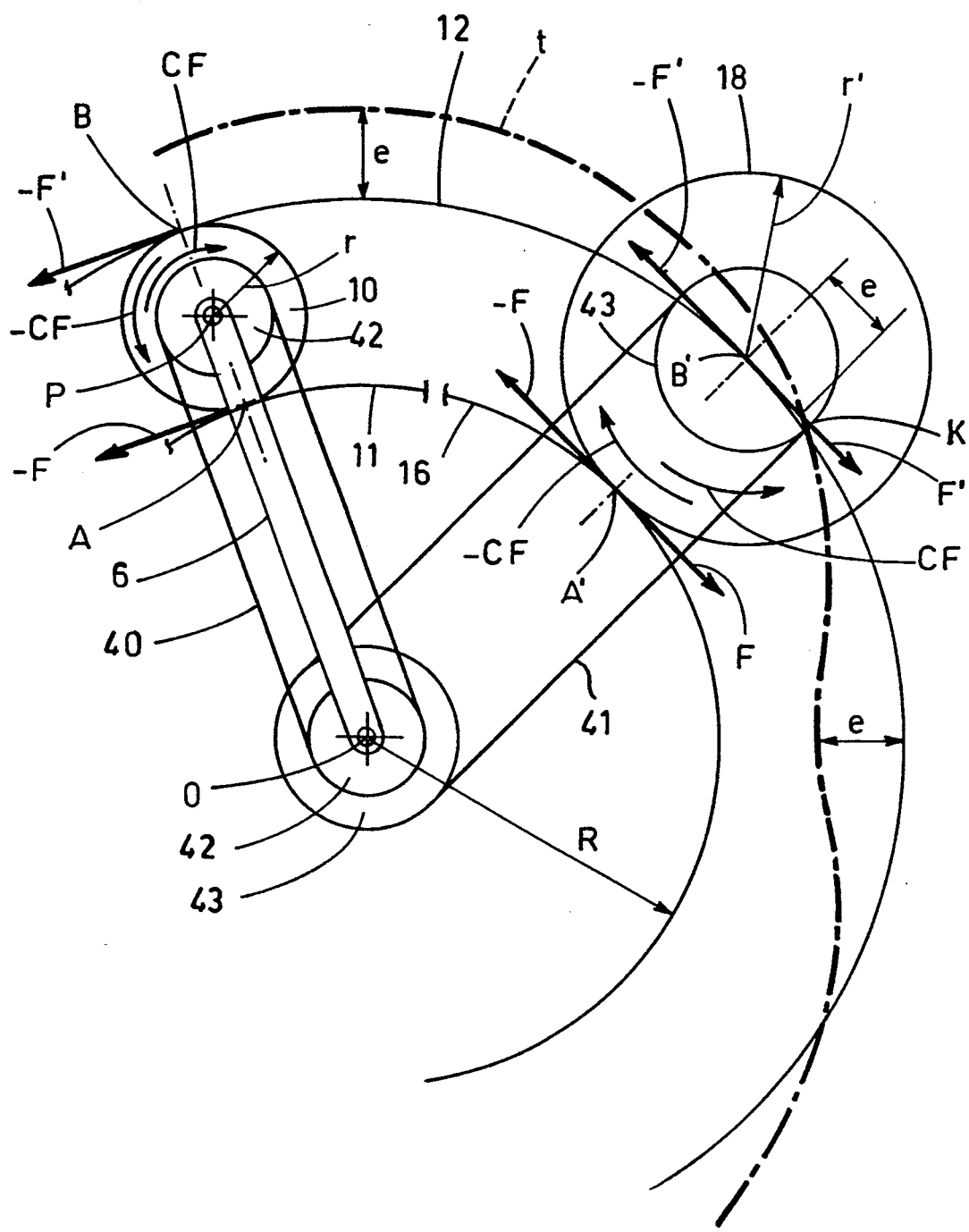
FIG. 3 is a diagrammatic graph showing the forces interacting in the device of the invention due to the operation of actuator means by which the dynamic connection between the drive shaft and driven shaft is carried out.
Figure 4:
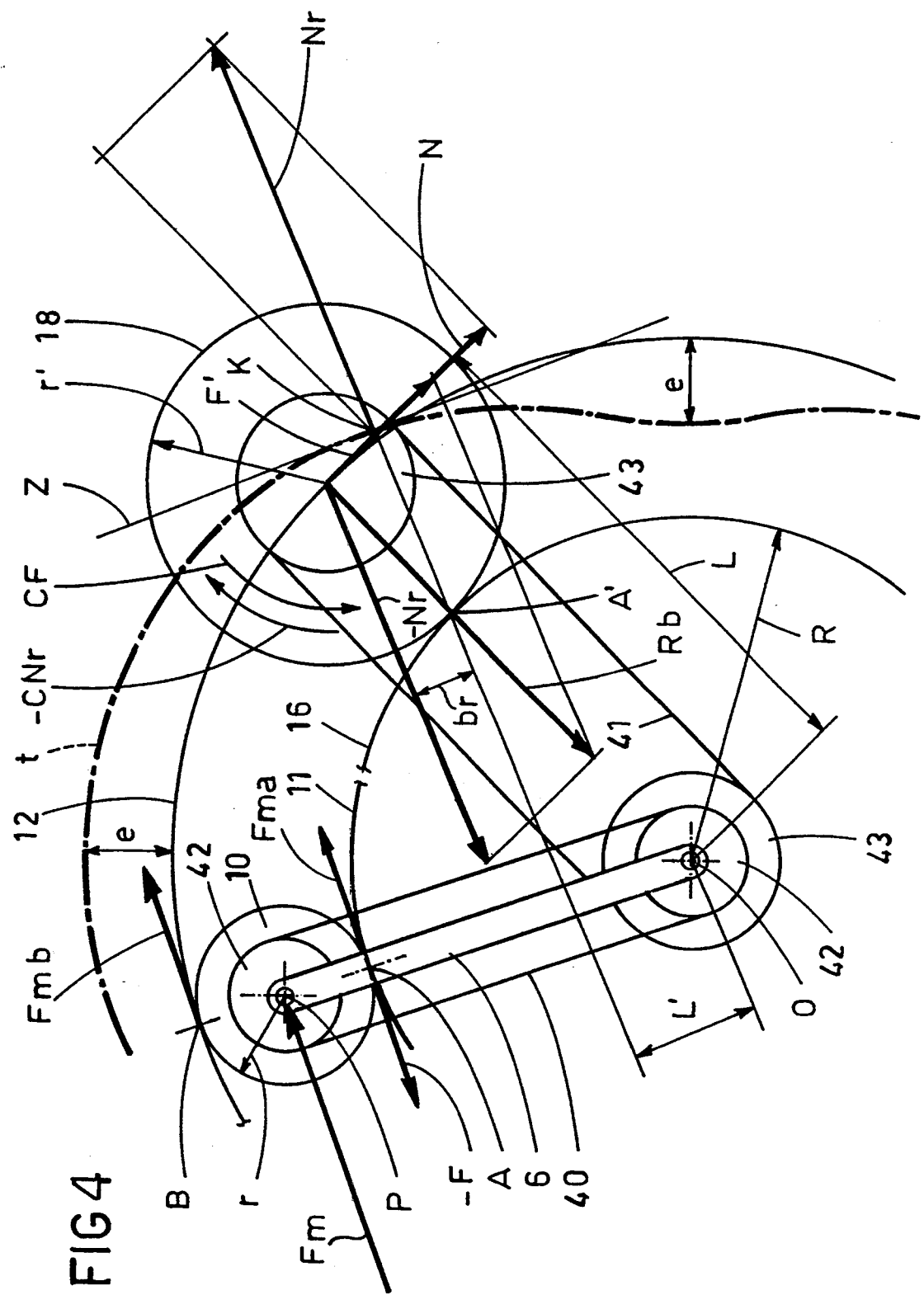
FIG. 4 is a diagrammatic graph showing the interaction between forces generated upon command of the actuator means and the motive power transmitted from the drive shaft for the purpose of transmitting motion to the driven shaft.

In order to better clarify the above explanation, the device of the invention has been diagrammatically shown in FIGS. 3 and 4 representing, in a fragmentary view taken in the opposite direction with respect to FIG. 2, one of the main planet wheels 10 in engagement between the first and second sun wheels 11, 12 at the meshing points A and B, the driving hub 6 acting on the centre P of the primary planet wheel 10, the crown gear 16 integral with the first sun wheel 11, one of the auxiliary planet wheels 18 rotatably engaged to the second sun wheel 12 at B' and meshing with the crown gear at A', and the trochoidal rolling track 23 represented by path "t" described by point K representing the axis of the interconnecting element 22, offset from axis B' of the auxiliary planet wheel by an amount of "e" value.

For the sake of clarity the first sun wheel 11 has been supposed to have a radius of pitch line R equal to that of the crown gear 16 and the primary planet wheel 10 has been supposed to include only one pinion meshing both with the first and second sun wheels 11, 12. In FIGS. 1 and 2 the equivalent connection carried out by the interconnecting sun wheel 20 between the primary 10 and auxiliary 18 planet wheels has also been diagrammaticaly shown by way of indication only, by means of flexibile elements 40, 41 stretched taut between respective pulleys 42, 43.

Referring particularly to FIG. 3, there are represented the forces interacting in the device of the invention when the actuator means 27 is operated while the driving hub 6 is not being moved by the first shaft 3.

As previously said, the engagement between the helical toothings of the auxiliary planet wheel 18 and crown gear 16 gives rise, due to the axial thrust produced on the planet wheel itself, to two equal and opposite tangential forces F and −F acting on the auxiliary planet wheel 18 and crown gear 16 respectively. Force F applied to the auxiliary planet wheel 18 produces a force F' on the planet wheel centre B going in the same way as F, and a torque CF going counter-clockwise and having a value equal to F r', r' being the radius of the pitch line of the auxiliary planet wheel the value of which is equal to ½ R.

Force −F applied to the crown gear 16 is directly transferred to the first sun wheel 11, at point A. Through the primary planet wheel 10, force −F will transmit a force −F' to the second sun wheel 12 at B, while simultaneously originating a torque −CF on the primary planet wheel having the same value but opposite way as compared with the torque CF present on the auxiliary planet wheel 18. Since the primary 10 and auxiliary 18 planet wheels are linked to each other in the rotational direction about their respective axes, through the flexible elements 40, 41, as a result torques CF and CF' will be mutually balanced. Likewise, also forces F' and −F', being transferred to the centre B' of the auxiliary planet wheel 18 and to the second sun wheel 12 and vice versa, will be mutually balanced.

As a result, in the absence of a motive power on the centre P of the primary planet wheel 10, forces arising by effect of the activation of the actuator means 27 become equivalent to perfectly balanced efforts internally to the device 1.

Shown in FIG. 4 are forces interacting in the device 1 when the first shaft is driven in rotation, due to the activation of the actuator means 27.

In this case, the driving hub 6 transmits to the centre P of the primary planet wheel 10 a motive power Fm that is divided into two forces Fma and Fmb applied to the meshing points A and B respectively of the primary planet wheel with the first sun wheel 11 and second sun wheel 12. Forces Fma and Fmb are parallel and oriented in the same way as the motive power Fm, and the sum thereof corresponds to the motive power value.

Force Fma balances force F applied to the first differential 11 and crown gear 16 by the actuator means 27. Therefore the effects of force −F' and torque −CF that counterbalanced the force −F' and torque CF are not present in the auxiliary planet wheel 18.

In the embodiment shown force −F is supposed to be perfectly counterbalanced by component Fma. Force −F can however have a higher value than Fma. In this case the overvalue of force −F will be balanced by a corresponding part of the value of force F' and torque CF according to the previous remarks with reference to FIG. 3.

Force Fmb, through the second sun wheel 12, is directly transferred to the centre B' of the auxiliary planet wheel 18 and is discharged at K into the rolling track 23 of the guide member 24 through the interconnecting member 22.

It is to be noted, to the ends of the instantaneous transmission of forces to point K, that the rolling track 23 behaves like an inclined plane according to the tangent "z" to the trajectory "t" at point K.

Therefore at point K the following forces will arise:
a force N having the same direction as Fmb and directly acting on the guide member 24 (in FIG. 4 the vector indicating force N applied to K is partially superposed with the vector indicating force F' applied to B); and
a resultant force Nr oriented at right angles to tangent "t", according to a direction passing by the meshing point A' between the auxiliary planet wheel 18 and the crown gear 16.

The force reaction −Nr to the resultant force Nr, translated to centre B of the auxiliary planet wheel 18, and force F' are summed up in a vectorial manner giving origin to a resultant balancing force Rb oriented towards the centre O of the device 1. The reaction to force Nr also gives rise, still on the auxiliary planet wheel 18, to a torque −CNr counteracting torque CF. The value of torque −CNr corresponds to the value of the resultant Nr multiplied by its arm "br" with respect to centre B' of the auxiliary planet wheel 18.

Therefore the overall twisting moment to be transmitted to the guide member 24 will be given by the sum of the moments produced by force N and resultant Nr relative to point O. It is noted that, under balance conditions with a relative speed between shafts 3 and 5 equal to zero, the overall twisting moment is equal to the moment produced by the motive power Fm, in accordance with the following equation:

$$N\ L + NR\ L' = Fm\ L''$$

where:
$L = R + r'$ is the distance between centres O and B';
$L'$ is the arm of action of the resultant Nr relative to centre O;
$L'' = R + r$ is the distance between centres O and P.

In conclusion, it has been found that the twisting moment thoroughly transmitted to the guide member 24 corresponds to the sum of the torque applied to the crown gear 16 through the first sun wheel 11 and the torque transmitted to the guide member by the second sun wheel 12 in cooperation with the auxiliary planet wheel 18 and the interconnecting element 22. Whereas the torque value applied through the crown gear 16 is constant under any operating condition, the value of the torque transmitted to the guide member 24 by effect of the actions carried out on the second sun wheel 12 corresponds to the value of the torque produced by force Fmb with respect to centre O multiplied by the ratio between the rotational speeds of the second sun wheel 12 and first sun wheel 11. Corresponding to this ratio is the number of revolutions carried out per unit time by the axis of the interconnecting element 22, that is point K, in the rolling track 23.

The value of the overall twisting moment transmitted to the second shaft 5 will be therefore subjected to variations proportional to the relative speed variation between the first and second shafts. In particular, when for example the angular speed of the second shaft 5 is lower than that of the first shaft 3, the twisting moment transmitted to the second shaft will be proportionally increased with respect to the value of the twisting moment present on the first shaft, in compliance with the equation:

$$Mt'\ VM = Mt''\ VU$$

where:
Mt' and Mt" stand for the twisting moments applied to the first and second shafts, 3 and 5 respectively;
VM and VU stand for the rotational speeds of the first and second shafts 3 and 5 respectively.

In other words, leaving aside the friction effects that on the other hand are very moderate, the power collected on the second shaft 5 will be always equal to the power applied to the first shaft 3.

Figures 5, 6:
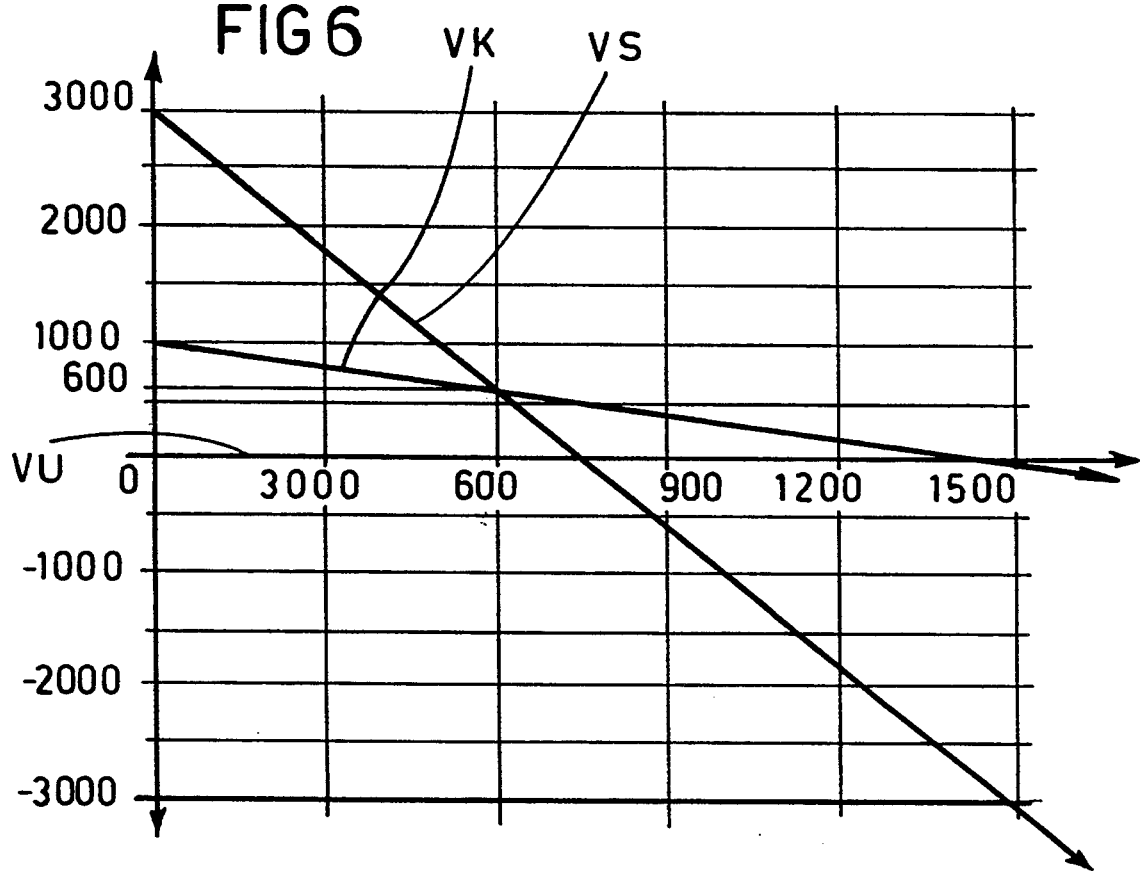
FIG. 5 is a table reproducing by way of indication, the values of the rotational speeds of the main members in the device and the torque values on the driven shaft, according to different gear ratios accomplished by the device itself.
FIG. 6 is a diagram based on data shown in the table of FIG. 5 and showing the variations in the rotational speeds of the main members of the device.

Some analytical results drawn on the basis of the above remarks are reproduced in the table in FIG. 5 in which, based on the dimensions shown in FIGS. 3 and 4, the following values are reproduced:

VM = rotational speed of the first shaft 3, expressed in r.p.m.;

VU = rotational speed of the second shaft 5 expressed in r.p.m., said speed being equal to the rotational speed of the first sun wheel 11 and crown gear 16;

VK = rotational speed, expressed in r.p.m., of the interconnecting element 22 about the axis of the guide member 24, said speed being equal to the rotational speed of the second sun wheel 17 and being expressed by equation:

$$VK = VU + (VM - VU) + R/r \ (VM - VU) \ r/L;$$

VS = rotational speed of the primary planet wheel 10 and auxiliary planet wheel 18 about the respective axes P and B', said speed being expressed by equation:

$$VS = VU + (VM - VU) + R/r \ (VM - VU);$$

Cus = torque applied to the crown gear 16 by force Fma, according to equation:

$$Cus = Fma \ R;$$

Cud = torque transmitted from the interconnecting element 22 to the guide member 24 according to equation:

$$Cud = Fma \ L \ (VK/VU);$$

Mt' = twisting moment on the first shaft 3, which twisting moment is considered by way of indication as a value corresponding to 1 Newton per meter;

Mt'' = overall twisting moment on the second shaft 5 the value of which expressed in Newton per meter corresponds to equation:

$$Mt'' = Cus + Cud.$$

Based on data reproduced in the table in FIG. 5, the graph shown in FIG. 6 represents the variation of speeds VK and VS, the values of which are quoted on the ordinates, in connection with the variation of speed VU of the second shaft 5, the speed VM of the first shaft 3 being considered as constant and equal to 600 r.p.m.

The present invention attains the intended purposes.

The device in reference in fact enables the dynamic connection between a first and a second shaft to be set up and broken off at will by merely activating and deactivating the actuator means 27.

In addition and above all, the device lends itself to transmit motion from the first shaft to the second shaft with outgoing torque values that grow as the speed of the second shaft decreases, like in a stepless speed change gear, without however involving the energy losses that are found in known speed change gears. It is in fact to be noted that the transmission of motion in the inventive device takes place in the complete absence of members designed to transmit said motion by friction and/or convert the mechanical energy to an energy of different kind, electric or hydraulic energy for example. Actually the transmission of motion exclusively occurs by virtue of the mutual interaction of the forces that are exchanged between the driving hub, the sun wheels of the differential gear, and the cycloidal gearing mating the trochoidal kinematic mechanism, through a plurality of elements in mutual contact and movable with respect to one another by rolling, in the substantial absence of slidings.

In particular it will be recognized that the differential gear 7 of the conventional type in the embodiment herein described can be replaced by a differential gear in which at least one of the planet wheels is provided with a trochoidal rolling track slidably engaging at least an interconnecting member eccentrically carried by the respective planet wheel.

In addition the actuator means may also act between the primary planet wheels and at least one of the sun wheels of the differential gear, instead of acting between the auxiliary planet wheels and the crown gear of the cycloidal gearing, as is the case in the described embodiment. The last mentioned embodiment however offers the advantage that all of the auxiliary planet wheels and corresponding interconnecting elements can act at their best on the crown gear and the guide member even in the presence of light geometrical and/or dimensional defects due to working tolerances.

The hydraulic circuit, by merely adopting double acting cylinders, can be accomplished so as to enable axial thrusts opposite the described ones to be applied for the achievement of braking actions on the second shaft.

Finally it is to be noted that the connection between the driving hub and the drive shaft and between the guide member and the driven shaft is not binding. Actually the device is capable of operating as above described even if motion is transmitted from the second shaft 5 to the first shaft 3.

What is claimed is:

1. A device for the dynamic coupling between two propeller shafts, with possibility of variation in the transmitted torque and speed values, characterized in that it comprises:

a driving hub coaxially linked to one shaft;

a differential gear having primary planet wheels rotatably interconnected with respect to the driving hub and operatively engaged between a first and a second sun wheel to distribute the twisting moment transmitted by the driving hub between said sun wheels;

a cycloidal gearing having a crown gear interconnected with the first sun wheel and a plurality of auxiliary planet wheels rotatably interconnected with the second sun wheel and meshing with said crown gear;

a trochoidal kinematic mechanism having a guide member linked to the crown gear in coaxial relation and a plurality of interconnecting elements each eccentrically carried by one of said auxiliary planet wheels and slidably engaging in a trochoidal rolling track formed in the guide member and extending according to the path described by each interconnecting member when the respective auxiliary planet wheel rolls on the crown gear;

actuator means to generate opposite tangential forces on the auxiliary planet wheels and crown gear, which forces interact with a motive power applied by the driving hub to the primary planet wheels, in order to transmit a twisting moment to a second shaft connected to the guide member.

2. A device according to claim 1, characterized in that it further comprises an interconnecting sun wheel freely rotating relative to the differential gear and cycloidal gearing and operatively engaging with the primary planet wheels and auxiliary planet wheels in order to mutually engage them relative to the rotations thereof about their own geometrical axes.

3. A device according to claim 2, characterized in that said interconnecting sun wheel mutually links the primary planet wheels and auxiliary planet wheels according to a 1:1 gear ratio.

4. A device according to claim 1, characterized in that said actuator means acts between the second sun wheel and the auxiliary planet wheels in order to transmit an axial-thrust action to the latter, said auxiliary planet wheels and crown gear being mutually interconnected through respective helical toothings in order to convert the axial-thrust action into said opposite tangential forces.

5. A device according to claim 4, characterized in that said actuator means comprises: a plurality of thrust pistons each of which rotatably engages one of said auxiliary planet wheels and is slidably and sealingly introduced into a pressurization chamber defined in the second sun wheel; a fluid supplying circuit communicating with each of the pressurization chambers to simultaneously send a working fluid under pressure thereinto, thereby giving rise to the axial-thrust action on the individual planet wheels through said pistons.

6. A device according to claim 5, characterized in that said fluid supplying circuit comprises: a plurality of supply ducts each communicating with one of the pressurization chambers; a distribution chamber formed in coaxial relation with the differential gear and communicating with said supply ducts; a feeding duct coaxially formed in the first shaft, fed with a working fluid under pressure and communicating with the distribution chamber through at least a connecting line; at least a cut off member acting in the connecting line in order to shutoff the passage of working fluid to the distribution chamber.

7. A device according to claim 9, characterized in that said cut off member is slidably engaged in a flanged element coaxially fastened to the driving hub and is movable, against the action of at least a preloading spring, by effect of the centrifugal force, in order to open the working fluid passage to the distribution chamber when the rotational speed of the driving hub exceeds a predetermined value.

8. A device according to claim 1, characterized in that each of said primary planet wheels comprises a supporting pin extending from the driving hub, parallelly to the axis thereof, and rotatably carrying a first and a second pinion integral with each other and operatively engaged with an outer toothing offered by the first sun wheel and an inner toothing offered by the second sun wheel respectively, the first pinion being of smaller diameter than the second pinion.

9. A device according to claim 6, characterized in that said primary planet wheels, by effect of the twisting moment from the driving hub, transmit substantially identical torques to the first and second sun wheels.

10. A device according to claim 6, characterized in that said primary planet wheels, by effect of the twisting moment from the driving hub, transmit a slightly lower torque to the first sun wheel as compared with the torque transmitted to the second sun wheel.

11. A device according to claim 1, characterized in that said auxiliary planet wheels are operatively engaged on the outer periphery of the crown gear and each have a radius of a pitch line equal to one half of the radius of a pitch line of said crown gear, said rolling track substantially exhibiting the configuration of a double epicycloid symmetrical to the axis of the crown gear.

12. A device according to claim 1, characterized in that each of said interconnecting elements comprises a supporting pin projecting from the corresponding auxiliary planet wheel and rotatably carrying at least a first and a second rollers disposed coaxially in side by side relation and acting by contact on the inner egde and outer edge respectively of said rolling track.

13. A device according to claim 12, characterized in that said guide member comprises a first shaped plate defining the inner edge of the rolling track and a second shaped plate defining the outer edge of said track and axially offset relative to the first plate.

* * * * *